US008885023B2

(12) United States Patent
Thiel et al.

(10) Patent No.: US 8,885,023 B2
(45) Date of Patent: Nov. 11, 2014

(54) SYSTEM AND METHOD FOR VIRTUAL CAMERA CONTROL USING MOTION CONTROL SYSTEMS FOR AUGMENTED THREE DIMENSIONAL REALITY

(75) Inventors: Aaron Thiel, Durham, CT (US); Michael Gay, Collinsville, CT (US); Anthony Bailey, Wallingford, CT (US)

(73) Assignee: Disney Enterprises, Inc., Burbank, CA (US)

( * ) Notice: Subject to any disclaimer, the term of this patent is extended or adjusted under 35 U.S.C. 154(b) by 110 days.

(21) Appl. No.: 12/807,330

(22) Filed: Sep. 1, 2010

(65) Prior Publication Data

US 2012/0050256 A1    Mar. 1, 2012

(51) Int. Cl.
*G06T 15/00* (2011.01)
*H04N 13/00* (2006.01)
*G06T 19/00* (2011.01)

(52) U.S. Cl.
CPC ............ *G06T 19/006* (2013.01); *H04N 13/004* (2013.01); *G06T 19/003* (2013.01)
USPC .......................................................... 348/47

(58) Field of Classification Search
None
See application file for complete search history.

(56) References Cited

U.S. PATENT DOCUMENTS

| 5,423,554 A * | 6/1995 | Davis ................................. 463/4 |
| 5,973,807 A * | 10/1999 | Buchkremer et al. .......... 359/25 |
| 8,014,985 B2 * | 9/2011 | Clavadetscher ................... 703/6 |
| 2007/0223910 A1 * | 9/2007 | Aoki et al. ..................... 396/301 |
| 2007/0238981 A1 * | 10/2007 | Zhu et al. ...................... 600/424 |
| 2008/0263460 A1 * | 10/2008 | Altberg et al. ................ 715/757 |
| 2009/0116732 A1 * | 5/2009 | Zhou et al. .................... 382/154 |
| 2009/0170600 A1 * | 7/2009 | Komatsumoto ................ 463/32 |

* cited by examiner

*Primary Examiner* — Sath V Perungavoor
*Assistant Examiner* — Kate Luo
(74) *Attorney, Agent, or Firm* — Farjami & Farjami LLP

(57) ABSTRACT

There is provided a system and method for integrating a virtual rendering system and a motion control system to provide an augmented three-dimensional reality. There is provided a method for integrating a virtual rendering system and a motion control system for outputting a composite three-dimensional render to a three-dimensional display, the method comprising obtaining, from the motion control system, a robotic three-dimensional camera configuration of a robotic three-dimensional camera in a real environment, programming the virtual rendering system using the robotic three-dimensional camera configuration to correspondingly control a virtual three-dimensional camera in a virtual environment, obtaining a virtually rendered three-dimensional feed using the virtual three-dimensional camera, capturing a video capture three-dimensional feed using the robotic three-dimensional camera, rendering the composite three-dimensional render by processing the feeds, and outputting the composite three-dimensional render to the three-dimensional display.

18 Claims, 4 Drawing Sheets

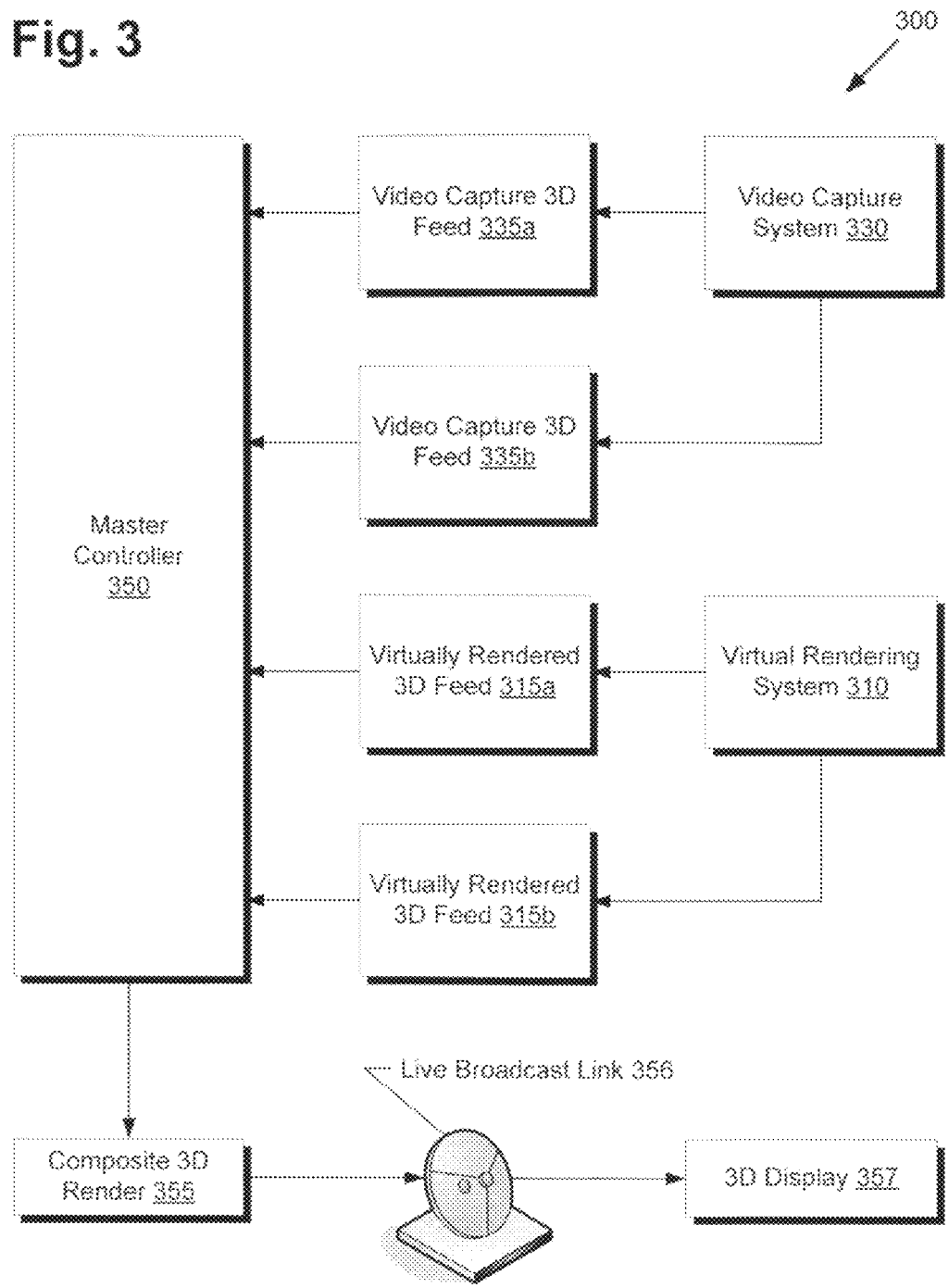

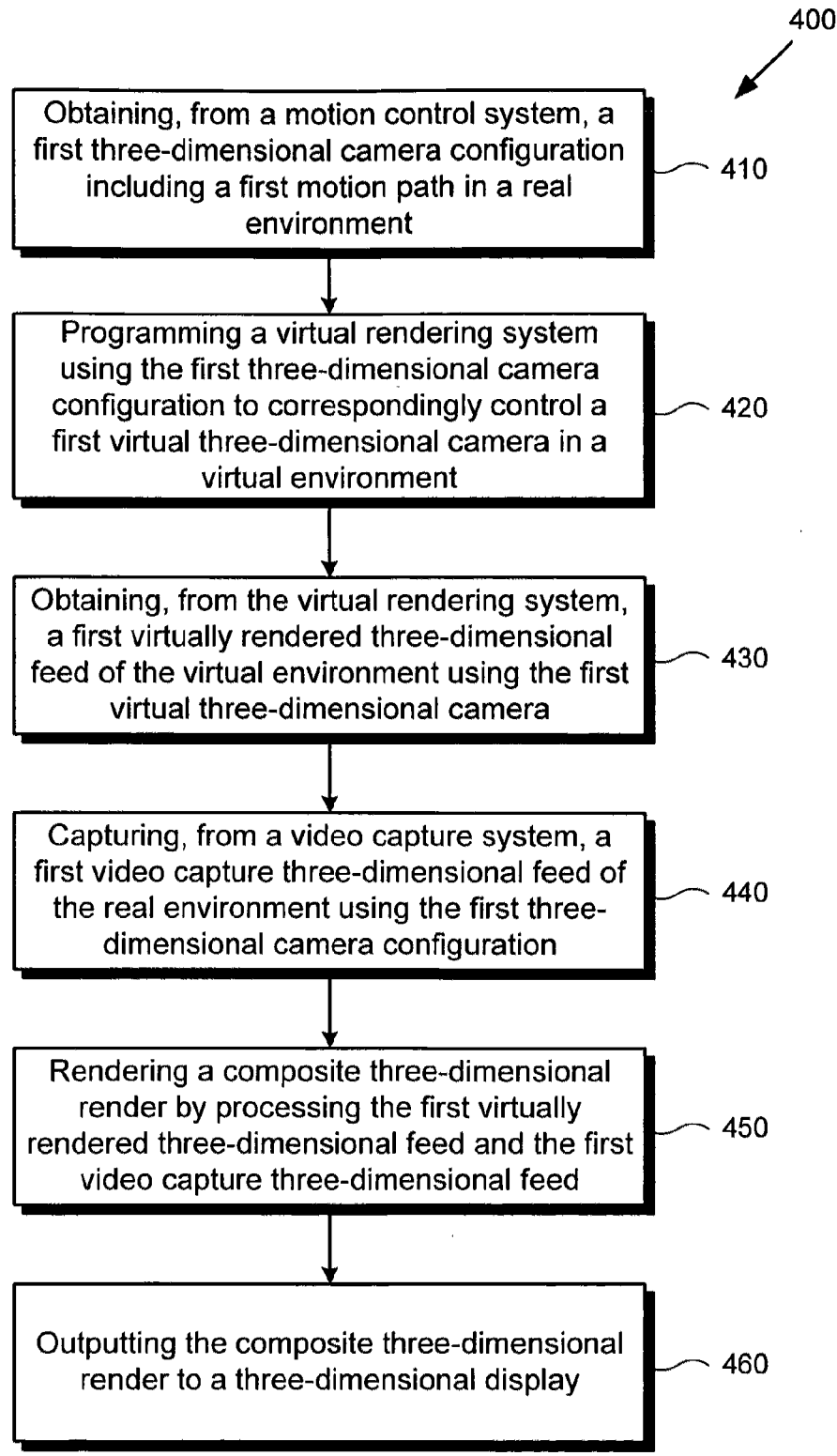

US 8,885,023 B2

SYSTEM AND METHOD FOR VIRTUAL CAMERA CONTROL USING MOTION CONTROL SYSTEMS FOR AUGMENTED THREE DIMENSIONAL REALITY

BACKGROUND OF THE INVENTION

1. Field of the Invention

The present invention relates generally to digital video. More particularly, the present invention relates to digital video rendering.

2. Background Art

Modern commodity PC hardware and videogame consoles are often equipped with sufficient processing capability to enable high-resolution real-time three-dimensional graphics rendering. Even portable devices such as mobile phones and handheld gaming systems are often equipped with scaled down real-time three-dimensional graphics support. Such low-cost commodity graphics processing hardware has enabled a wide variety of entertainment and productivity applications to support enhanced visual presentations for greater user engagement and enjoyment.

In particular, real-time three-dimensional graphics rendering has found itself as a highly supportive role in live broadcast programming, especially for providing analysis and commentary. While materials such as pre-rendered animations or real life reenactments have been used previously for analysis and commentary, the time and resources required to produce such materials precludes their use for live events. Thus, for coverage of live sports and other events, low cost commodity graphics hardware can be utilized to provide timely analysis using composite renderings with real-time generated three-dimensional graphics, allowing the use of alternative or substitute object rendering, strategy simulations, information boxes, alternative viewpoints, and other effects.

While three-dimensional analysis tools exist for composite rendering, such tools cannot be used to accurately replay prior camera paths using manually controlled camera systems. As a result, important ongoing events such as a winning play or a brilliant strategy cannot be effectively analyzed. Furthermore, manually controlled camera systems are difficult to synchronize with virtual environment camera systems, as the camera operator cannot perceive the virtual environment. Absent such synchronization, it is difficult to create acceptable composite rendering within real-time constraints. As a result, viewer engagement is low since analysis is limited to imprecise and unsynchronized manually controlled camera movements. Moreover, since such analysis tools conventionally output only a standard two-dimensional composite rendering for output to a standard two-dimensional display, viewer engagement is further reduced as it becomes difficult for viewers to appreciate field depth and feel immersed into the rendered environment.

Accordingly, there is a need to overcome the drawbacks and deficiencies in the art by providing a way to create composite three-dimensional renderings using live three-dimensional footage and real-time three-dimensional graphics rendering for viewing on a three-dimensional display to provide high viewer impact and engagement.

SUMMARY OF THE INVENTION

There are provided systems and methods for integrating a virtual rendering system and a motion control system to provide an augmented three dimensional reality, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein:

FIG. 3 presents a diagram of a composite three-dimensional render being generated, according to one embodiment of the present invention; and FIG. 4 shows a flowchart describing the steps, according to one embodiment of the present invention, by a virtual rendering system and a motion control system may be integrated for outputting a composite three-dimensional render of an augmented three-dimensional reality to a three-dimensional display.

DETAILED DESCRIPTION OF THE INVENTION

The present application is directed to a system and method for integrating a virtual rendering system and a motion control system to provide an augmented three-dimensional reality. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings.

Figure 1:
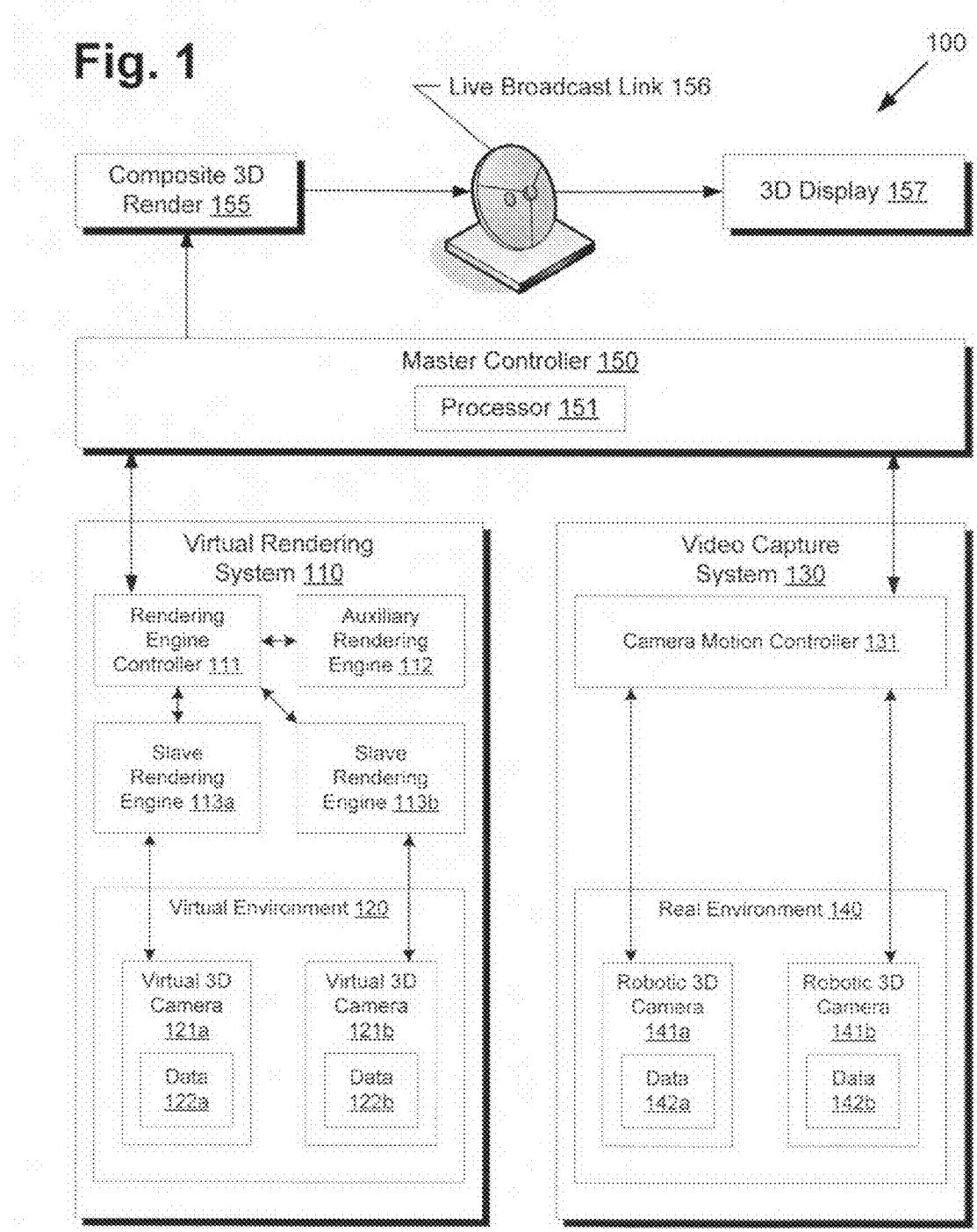
FIG. 1 presents a system for integrating a virtual rendering system and a motion control system to provide an augmented three-dimensional reality, according to one embodiment of the present invention.

FIG. 1 presents a system for integrating a virtual rendering system and a motion control system to provide an augmented three-dimensional reality, according to one embodiment of the present invention. Diagram 100 of FIG. 1 includes virtual rendering system 110, video capture system 130, master controller 150, composite 3D render 155, live broadcast link 156, and 3D display 157. Virtual rendering system 110 includes rendering engine controller 111, auxiliary rendering engine 112, slave rendering engines 113a-113b, and virtual environment 120. Virtual environment 120 includes virtual 3D cameras 121a-121b. Virtual 3D camera 121a includes data 122a. Virtual 3D camera 121b includes data 122b. Video capture system 130 includes camera motion controller 131 and real environment 140. Real environment 140 includes robotic 3D cameras 141a-141b. Robotic 3D camera 141a includes data 142a. Robotic 3D camera 141b includes data 142b. Master controller 150 includes processor 151.

Rendering engine controller 111, auxiliary rendering engine 112, slave rendering engine 113a, and slave rendering engine 113b may each execute on several separate servers, each comprising standard commodity PC hardware or a videogame console system. Alternatively, the engines of virtual rendering system 110 may be consolidated into a single server, or distributed remotely across a network to minimize the amount of necessary on-site hardware. Rendering engine controller 111 may coordinate control and data sharing between the different rendering subsystems, as shown in FIG. 1. Auxiliary rendering engine 112 may provide static graphics overlays and other graphical effects that do not require input from virtual environment 120. Slave rendering engines 113a-113b each control virtual cameras 121a-121b respectively to receive a virtually rendered 3D feed of virtual environment 120. For example, virtual 3D camera 121a may include two virtual lenses spaced apart to provide a defined interocular distance for stereoscopic viewing. However, alternative embodiments may use more than two virtual lenses.

Real environment 140 corresponds to an actual physical environment represented by virtual environment 120. For example, real environment 140 might comprise an indoor or outdoor sports field or stadium, a golf course, a natural environment, an urban environment, or any other locale. Besides sports entertainment environments, other environments for focuses such as educational or informational applications may also be used. Virtual environment 120 may then be created using manual three-dimensional environmental modeling, automated photographic or video extrapolation, or some other manual or automated method.

Data 142a-142b describing the configuration of robotic 3D cameras 141a-141b within real environment 140 may each include, for example, position data such as three-dimensional coordinates, camera field of view orientation data such as camera angle, focal length and focus distance, movement data such as a motion path or velocity and acceleration, and camera characteristics such as three-dimensional camera lens parameters, camera size, center of lens, and other camera model details. Since robotic 3D cameras 141a-141b may each include two or more lenses to support 3D capture, the corresponding data 142a-142b may contain parameters describing the three-dimensional lenses, such as the positioning and spacing between lenses to define interocular distance. Three-dimensional coordinates between virtual environment 120 and real environment 140 may be defined using a common frame of reference, such as setting a particular corner of a field or a particular landmark as a common (0, 0, 0) coordinate. The motion path may then describe the changing of the above data parameters with respect to time, such as the three-dimensional coordinates with respect to time, the camera field of view with respect to time, and the lens parameters with respect to time.

Master controller 150 may be executing a control program using processor 151 to receive data 142a-142b from camera motion controller 131 of video capture system 130. Camera motion controller 131 may, for example, query robotic 3D cameras 141a-141b to retrieve data 142a-142b, respectively. The motion path data in data 142a-142b may be dictated by manual control such as by a camera operator, by tracking the motion of a particular object or focusing on a particular scene in either virtual environment 120 or real environment 140, by replaying a previously recorded path of movement or another predetermined path, by a video analysis using video capture system 130, or by using some other criteria. Tracked objects may include, for example, a ball or a participating player of a game such as a sports match, and may be virtual or real. Thus, robotic 3D cameras 141a-141b can function as motion control cameras. Camera motion controller 131 might also accept user input to modify the motion paths contained in data 142a-142b.

Processor 151 of master controller 150 may then direct virtual rendering system 110 to control virtual 3D cameras 121a-121b according to the retrieved motion path data from data 142a-142b. Once the virtual cameras are properly configured by appropriately programming the motion paths of data 122a-122b, master controller 150 may then query virtual rendering system 110 for virtually rendered 3D feeds and video capture system 130 for video capture 3D feeds. Master controller 150 may then act as a rendering controller by combining the feeds smoothly using standard broadcast key technology such as chroma key or key/fill to generate composite 3D render 155, which includes real and virtual 3D feed elements arranged in a specific desired manner for broadcast over live broadcast link 156 to 3D display 157. Live broadcast link 156 may comprise, for example, a satellite uplink to a television studio, from where the broadcasted material is disseminated to the general public. 3D display 157 may then represent, for example, a 3D capable television of a viewer watching the broadcast. For example, 3D display 157 may alternate left and right images rapidly, for example at 120 frames per second, and the viewer may wear active shutter eyeglasses to direct the left and right images to the left and right eyes, respectively. Other methods of displaying 3D content or stereoscopy may also be utilized, such as filtered images for use with polarized glasses or a parallax barrier display.

Although virtual rendering system 110 of FIG. 1 depicts only two slave rendering engines each controlling exactly one virtual 3D camera, alternative embodiments may use any arbitrary number of slave rendering engines to control any arbitrary number of virtual 3D cameras. More specifically, each slave rendering engine may control more than one virtual 3D camera. Similarly, although video capture system 130 of FIG. 1 only depicts two robotic 3D cameras, alternative embodiments may use any arbitrary number of robotic 3D cameras to be controlled by camera motion controller 131 of video capture system 130. In this manner, the composite 3D rendering system shown in FIG. 1 can be scaled to as many camera angles and viewpoints as desired, in either virtual environment 120 or real environment 140.

Figure 2:
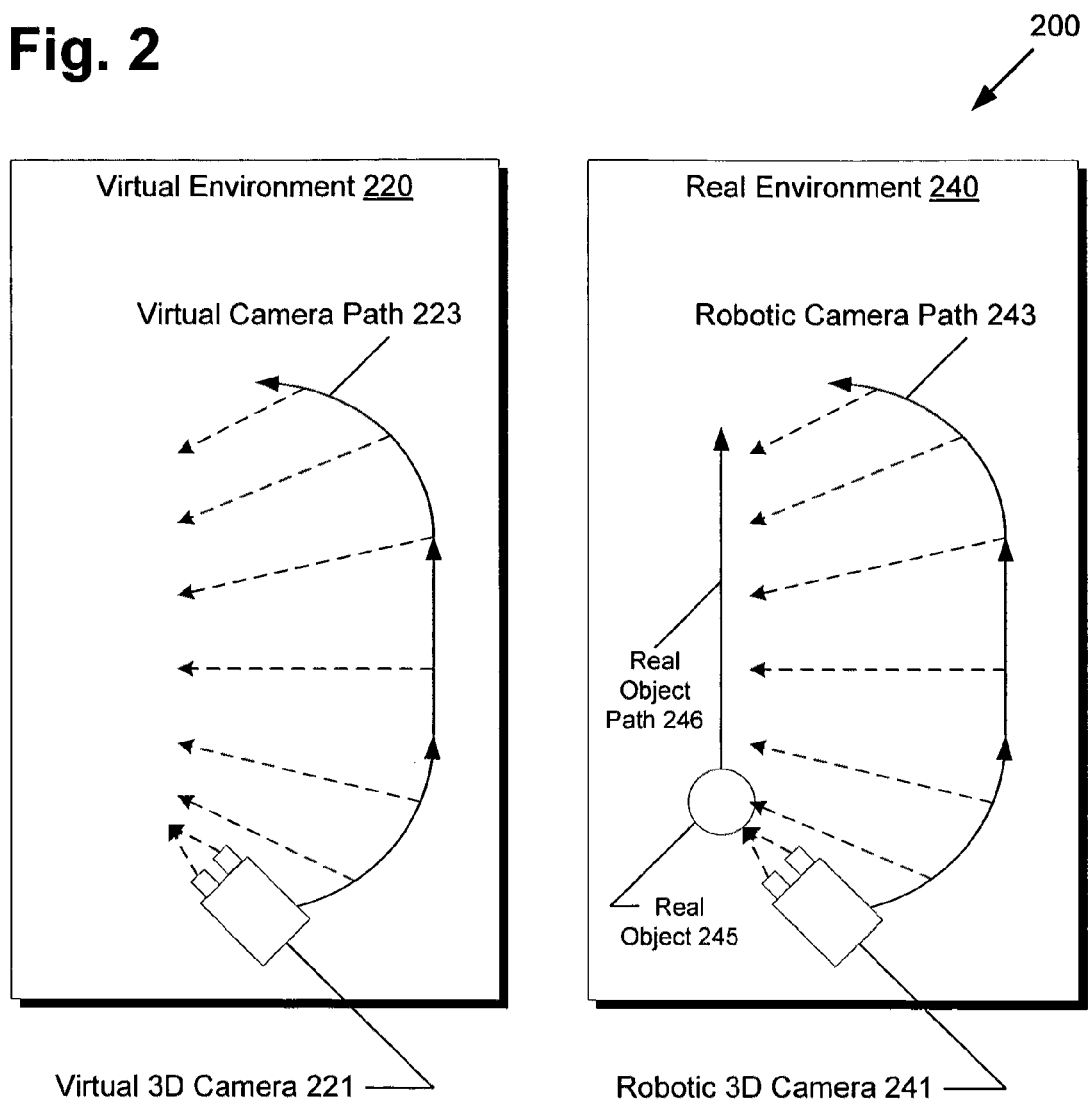
FIG. 2 presents a diagram of a virtual three-dimensional camera path configured to match a robotic three-dimensional camera path used by a motion control system, according to one embodiment of the present invention.

FIG. 2 presents a diagram of a virtual three-dimensional camera path configured to match a robotic three-dimensional camera path used by a motion control system, according to one embodiment of the present invention. Diagram 200 of FIG. 2 includes virtual environment 220 and real environment 240. Virtual environment 220 includes virtual 3D camera 221 and virtual camera path 223. Real environment 240 includes robotic 3D camera 241, robotic camera path 243, real object 245, and real object path 246. With regards to FIG. 2, it should be noted that virtual environment 220 corresponds to virtual environment 120 from FIG. 1 and that real environment 240 corresponds to real environment 140 from FIG. 1. Moreover, although FIG. 2 only depicts a single virtual 3D camera and a single robotic 3D camera for simplicity, alternative embodiments may use multiple virtual 3D cameras and multiple robotic 3D cameras.

As previously discussed in FIG. 1, master controller 150 may direct video capture system 130 to control virtual cameras according to motion paths provided by a motion control system. FIG. 2 shows an example of this manner of control, where robotic 3D camera 241, comprising a motion control 3D camera such as a gantry supported fly-by 3D camera, is programmed to record a path of movement. For example, robotic 3D camera 241 may be programmed to focus on the movement of real object 245, a football, following real object path 246, a long distance pass. Thus, robotic 3D camera 241 may follow robotic camera path 243, with camera orientation following real object path 246 as indicated by the dotted arrows. As shown in diagram 200 of FIG. 2, 3D cameras with multiple lenses may be configured to converge on an object of interest such as real object 245. Robotic camera path 243 may then be recorded and programmed into virtual 3D camera 221 of virtual environment 220, so that virtual 3D camera 221 can follow virtual camera path 223 mirroring robotic camera path 243.

As shown in FIG. 2, the camera orientation of virtual 3D camera 221 moves as if it were following real object path 246 within virtual environment 220, even though there is no corresponding virtual object for real object 245 in virtual environment 220. By using the system described above in FIG. 1, virtual 3D camera 221 can thus be synchronized to the camera movements of robotic 3D camera 241. Composite 3D rendering of real and virtual 3D environments, also known as "augmented 3D reality", is thus facilitated, as the camera views in virtual environment 220 and real environment 240 can be matched according to any desired camera path, opening up limitless possibilities for dynamic camerawork. Previously recorded camera paths may also be recorded into storage for future replay, both by robotic 3D cameras and virtual 3D cameras.

The example shown in FIG. 2 might be used, for example, to present a dynamic panning camera view showing the long distance football pass defined by real object path 246 according to several virtual scenarios. For example, players might be virtually positioned and simulated in various scenarios to determine whether an alternative strategy might have resulted in an interception of the pass. Thus, a composite 3D render might show a real sports field background and the actual football, or real object 245, in a video feed captured from real environment 240, but with virtual players rendered in virtual environment 220. Thus, the composite 3D render can provide a realistic camera fly-by with the football and background elements from real environment 240 and virtual players rendered from virtual environment 220. Since the composite 3D render will be targeted for 3D displays, viewers can more easily appreciate field depth and feel immersed into the rendered 3D environment. Variations of this procedure may thus be used to present various hypothetical plays and strategy analyses in a realistic and engaging manner for high viewer impact.

FIG. 3 presents a diagram of a composite three-dimensional render being generated, according to one embodiment of the present invention. Diagram 300 of FIG. 3 includes virtual rendering system 310, virtually rendered 3D feeds 315a-315b, video capture system 330, video capture 3D feeds 335a-335b, master controller 350, composite 3D render 355, live broadcast link 356, and 3D display 357. With regards to FIG. 3, it should be noted that virtual rendering system 310 corresponds to virtual rendering system 110 from FIG. 1, that video capture system 330 corresponds to video capture system 130, that master controller 350 corresponds to master controller 150, that composite 3D render 355 corresponds to composite 3D render 155, that live broadcast link 356 corresponds to live broadcast link 156, and that 3D display 357 corresponds to 3D display 157. For simplicity, certain elements are omitted from FIG. 3, such as a processor for master controller 350.

As shown in FIG. 3, virtual rendering system 310 provides master controller 350 with virtually rendered 3D feeds 315a-315b, while video capture system 330 provides master controller 350 with video capture 3D feeds 335a-335b. For example, video capture 3D feed 335a might correspond to a feed generated by robotic 3D camera 241 in FIG. 2, whereas virtually rendered 3D feed 315a might correspond to a feed generated by virtual 3D camera 221 in FIG. 2. Virtually rendered 3D feed 315b may correspond to a feed created by an overhead virtual camera providing a bird's eye overview of virtual environment 220 from FIG. 2, whereas video capture 3D feed 335b may correspond to a feed created by an overhead robotic camera providing a bird's eye overview of real environment 240 from FIG. 2.

Master controller 350 may then combine virtually rendered 3D feed 315a and video capture 3D feed 335a for an augmented reality fly-by scene and also combine virtually rendered 3D feed 315b and video capture 3D feed 335b for an augmented reality bird's eye overview scene. As previously discussed, master controller 350 may use standard broadcast key technologies to combine the different feeds smoothly so that the juxtaposition of real and virtual elements is visually unobtrusive. Master controller 350 may then use these combined scenes in composite 3D render 355 through various presentation methods such as split screen, cascaded or tiled frames, "picture-in-picture", three-dimensional surfaces, and other formatted layouts. Master controller 350 may then forward composite 3D render 355 over live broadcast link 356 for showing on 3D display 357. Master controller 350 may repeat the above process of generating composite 3D render 355 in a periodic manner, such as 24, 30, or 60 times per second or higher in order to accommodate a desired video broadcasting framerate.

Although FIG. 3 only shows a single composite 3D render 355, alternative embodiments may use several composite 3D renders. For example, master controller 350 may generate multiple composite 3D renders to provide different camera views for multiple broadcast channels, to customize based on a target broadcast region or audience demographics, to focus on a particular team in a sports match, or to support any other broadcasting application that may require multiple concurrent 3D video streams. By adding additional slave rendering engines and robotic cameras, augmented 3D reality rendering systems can be readily scaled and configured to support large-scale projects.

FIG. 4 shows a flowchart describing the steps, according to one embodiment of the present invention, by a virtual rendering system and a motion control system may be integrated for outputting a composite three-dimensional render of an augmented three-dimensional reality to a three-dimensional display. Certain details and features have been left out of flowchart 400 that are apparent to a person of ordinary skill in the art. For example, a step may comprise one or more substeps or may involve specialized equipment or materials, as known in the art. While steps 410 through 460 indicated in flowchart 400 are sufficient to describe one embodiment of the present invention, other embodiments of the invention may utilize steps different from those shown in flowchart 400.

Referring to step 410 of flowchart 400 in FIG. 4 and diagram 100 of FIG. 1, step 410 of flowchart 400 comprises obtaining, from camera motion controller 131 of video capture system 130, data 142a of robotic 3D camera 141a in real environment 140. Camera motion controller 131 may then retrieve data 142a from robotic 3D camera 141a for relaying back to master controller 150. As previously described, data 142a may contain various information concerning the configuration of robotic 3D camera 141a such as three-dimensional position and movement, camera focus and view, camera model parameters, lens configuration for 3D capture, and other details.

Referring to step 420 of flowchart 400 in FIG. 4 and diagram 100 of FIG. 1, step 420 of flowchart 400 comprises programming virtual rendering system 110 using data 142a obtained from step 410 to correspondingly control virtual 3D camera 121*a* in virtual environment 120. For example, master controller 150 may instruct rendering engine controller 111 to program values into data 122*a* to match data 142*a* as closely as possible. As previously discussed, data 142*a* may include three-dimensional coordinates, camera field of view, and 3D lens parameters with respect to time. Assuming virtual 3D camera 221 and robotic 3D camera 241 correspond to virtual 3D camera 121*a* and robotic 3D camera 141*a*, the result of setting data 122*a* to match data 142*a* may be manifested by virtual camera path 223 mimicking robotic camera path 243, as shown in FIG. 2.

Referring to step 430 of flowchart 400 in FIG. 4, diagram 200 of FIG. 2, and diagram 300 of FIG. 3, step 430 of flowchart 400 comprises obtaining, from virtual rendering system 310, virtually rendered 3D feed 315*a* of virtual environment 220 using virtual 3D camera 221. Since the motion path of virtual camera 221 was previously programmed in step 420, step 430 results in master controller 350 receiving virtually rendered 3D feed 315*a* comprising fly-by footage according to virtual camera path 223.

Referring to step 440 of flowchart 400 in FIG. 4, diagram 200 of FIG. 2, and diagram 300 of FIG. 3, step 440 of flowchart 400 comprises obtaining, from video capture system 330, video capture 3D feed 335*a* of real environment 240 using robotic 3D camera 241. As previously discussed, robotic camera path 243 may be defined in any number of ways, such as by manual control, object tracking, recorded motion replay, or predetermined paths. As shown in FIG. 2, robotic camera path 243 is defined as an arc with the camera field of view following real object 245 as it progresses through real object path 246. Thus, master controller 350 may receive video capture 3D feed 335*a* comprising fly-by footage according to robotic camera path 243, wherein the feed includes a rendering of real object 245.

Referring to step 450 of flowchart 400 in FIG. 4 and diagram 300 of FIG. 3, step 450 of flowchart 400 comprises rendering composite 3D render 355 by processing video capture 3D feed 335*a* from step 440 and virtually rendered 3D feed 315*a* from step 430. As previously discussed, master controller 350 may accomplish step 450 using standard broadcast key technology such as chroma key or key/fill techniques to isolate and combine components from each feed to produce a result with a smooth visual juxtaposition of real and virtual 3D elements.

Referring to step 460 of flowchart 400 in FIG. 4 and diagram 300 of FIG. 3, step 460 of flowchart 400 comprises outputting composite 3D render 355 from step 450 to 3D display 357. As shown in FIG. 3, master controller 350 may send composite 3D render 355 using live broadcast link 356, which might comprise a satellite uplink to a broadcast station for public dissemination. Eventually, composite render 355 shows on 3D display 357, which might comprise the television of a viewer at home. As previously discussed, various 3D display technologies may be used such as active shutter glasses, polarized glasses, or parallax barrier.

While the above steps 410-460 have been described with respect to a single virtual 3D camera, a single robotic 3D camera, and a single composite 3D render, steps 410-460 may also be repeated as necessary to support multiple virtual 3D cameras, multiple robotic 3D cameras, and multiple composite 3D renders, as previously described. In this manner, the described rendering system can be flexibly scaled to larger projects by increasing the number of slave rendering systems and robotic 3D cameras to handle additional 3D feeds in real-time.

In this manner, live events such as sports can be enhanced with high-impact augmented 3D reality segments by leveraging the cost effective real-time graphical capabilities of modern commodity PC hardware and game consoles. This can provide networks with a competitive advantage by drawing in and retaining greater viewership by providing compelling augmented reality 3D content while requiring only minor additional infrastructure outlays over standard rendering systems. Since commodity hardware parts are used and numerous effective virtual rendering systems and engines are available for licensing, expensive proprietary systems and vendor lockout may be avoided, further reducing total cost of ownership.

From the above description of the invention it is manifest that various techniques can be used for implementing the concepts of the present invention without departing from its scope. Moreover, while the invention has been described with specific reference to certain embodiments, a person of ordinary skills in the art would recognize that changes can be made in form and detail without departing from the spirit and the scope of the invention. As such, the described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. A method for integrating a virtual rendering system and a motion control system to output a composite three-dimensional render to a three-dimensional display, the method comprising:

obtaining, from the motion control system, a first three-dimensional camera configuration, wherein the first three-dimensional camera configuration includes camera position data, camera field of view orientation data, camera movement data and camera lens characteristics data;

programming the virtual rendering system using the first three-dimensional camera configuration to correspondingly control a first virtual three-dimensional camera in a virtual environment;

obtaining, from the virtual rendering system, a first virtually rendered three-dimensional feed of the virtual environment using the first virtual three-dimensional camera;

capturing, from a video capture system, a first video capture three-dimensional feed of a real environment using the first three-dimensional camera configuration;

rendering the composite three-dimensional render, based on a target broadcast region, by processing the first virtually rendered three-dimensional feed and the first video capture three-dimensional feed, wherein the composite three-dimensional render includes simulating at least one virtual player with a real tracked object; and outputting the composite three-dimensional render to the three-dimensional display.

2. The method of claim 1, wherein the first three-dimensional camera configuration includes a first motion path in the real environment, and the first motion path includes a three-dimensional position with respect to time.

3. The method of claim 1, wherein the first three-dimensional camera configuration includes a first motion path in the real environment, and the first motion path includes a camera orientation or field of view with respect to time.

4. The method of claim 1, wherein the camera lens characteristics data includes three-dimensional camera lens parameters.

5. The method of claim 1, wherein the first three-dimensional camera configuration includes a first motion path in the real environment, and the first motion path is based on a predetermined path.

6. The method of claim 1, wherein the first three-dimensional camera configuration includes a first motion path in the real environment, and the first motion path is based on a previously recorded path.

7. The method of claim 1, wherein the first three-dimensional camera configuration includes a first motion path in the real environment, and the first motion path is based on a video analysis using the video capture system.

8. The method of claim 1, wherein the first three-dimensional camera configuration includes a first motion path in the real environment, and wherein the method further comprising prior to the programming of the virtual rendering system, modifying the first motion path according to a user input.

9. The method of claim 1 further comprising prior to the rendering of the composite three-dimensional render:
obtaining, from the motion control system, a second three-dimensional camera configuration including a second motion path in the real environment;
programming the virtual rendering system using the second three-dimensional camera configuration to correspondingly control a second virtual three-dimensional camera in the virtual environment;
obtaining, from the virtual rendering system, a second virtually rendered three-dimensional feed of the virtual environment using the second virtual three-dimensional camera;
capturing, from a video capture system, a second video capture three-dimensional feed of the real environment using the second three-dimensional camera configuration;
wherein the rendering of the three-dimensional composite render further processes the second virtually rendered three-dimensional feed and the second video capture three-dimensional feed.

10. A rendering controller for outputting a composite three-dimensional render to a three-dimensional display, the rendering controller comprising:
a processor configured to:
obtain, from a motion control system, a first three-dimensional camera configuration, wherein the first three-dimensional camera configuration includes camera position data, camera field of view orientation data, camera movement data and camera lens characteristics data;
program a virtual rendering system using the first three-dimensional camera configuration to correspondingly control a first virtual three-dimensional camera in a virtual environment;
obtain, from the virtual rendering system, a first virtually rendered three-dimensional feed of the virtual environment using the first virtual three-dimensional camera;
capture, from a video capture system, a first video capture three-dimensional feed of a real environment using the first three-dimensional camera configuration;
render the composite three-dimensional render, based on a target broadcast region, by processing the first virtually rendered three-dimensional feed and the first video capture three-dimensional feed, wherein the composite three-dimensional render includes simulating at least one virtual player with a real tracked object; and
output the composite three-dimensional render to the three-dimensional display.

11. The rendering controller of claim 10, wherein the first three-dimensional camera configuration includes a first motion path in the real environment, and the first motion path includes a three-dimensional position with respect to time.

12. The rendering controller of claim 10, wherein the first three-dimensional camera configuration includes a first motion path in the real environment, and the first motion path includes a camera orientation or field of view with respect to time.

13. The rendering controller of claim 10, wherein the camera lens characteristics data includes three-dimensional camera lens parameters.

14. The rendering controller of claim 10, wherein the first three-dimensional camera configuration includes a first motion path in the real environment, and the first motion path is based on a predetermined path.

15. The rendering controller of claim 10, wherein the first three-dimensional camera configuration includes a first motion path in the real environment, and the first motion path is based on a previously recorded path.

16. The rendering controller of claim 10, wherein the first three-dimensional camera configuration includes a first motion path in the real environment, and the first motion path is based on a video analysis using the video capture system.

17. The rendering controller of claim 10, wherein the first three-dimensional camera configuration includes a first motion path in the real environment, and wherein prior to the programming of the virtual rendering system, the processor is configured to modify the first motion path according to a user input.

18. The rendering controller of claim 10, wherein prior to the rendering of the composite three-dimensional render the processor is configured to:
obtain, from the motion control system, a second three-dimensional camera configuration including a second motion path in the real environment;
program the virtual rendering system using the second three-dimensional camera configuration to correspondingly control a second virtual three-dimensional camera in the virtual environment;
obtain, from the virtual rendering system, a second virtually rendered three-dimensional feed of the virtual environment using the second virtual three-dimensional camera; and
capture, from a video capture system, a second video capture three-dimensional feed of the real environment using the second three-dimensional camera configuration;
wherein the processor is configured to render the composite three-dimensional render by further processing the second virtually rendered three-dimensional feed and the second video capture three-dimensional feed.

* * * * *